United States Patent
Pritzkau et al.

(10) Patent No.: US 10,826,926 B2
(45) Date of Patent: Nov. 3, 2020

(54) PATTERN CREATION BASED ON AN ATTACK PATH

(71) Applicant: SAP SE, Walldorf (DE)

(72) Inventors: Eugen Pritzkau, Wiesloch (DE); Wei-Guo Peng, Elztal (DE); Omar-Alexander Al-Hujaj, Bad Schönborn (DE); Lin Luo, Rauenberg (DE); Volker Guzman, Heidelberg (DE); Kevin Schwab, Sandhausen (DE)

(73) Assignee: SAP SE, Walldorf (DE)

( * ) Notice: Subject to any disclaimer, the term of this patent is extended or adjusted under 35 U.S.C. 154(b) by 289 days.

(21) Appl. No.: 16/037,509

(22) Filed: Jul. 17, 2018

(65) Prior Publication Data
US 2020/0028861 A1    Jan. 23, 2020

(51) Int. Cl.
*H04L 29/06* (2006.01)

(52) U.S. Cl.
CPC ...... *H04L 63/1425* (2013.01); *H04L 63/1416* (2013.01); *H04L 63/20* (2013.01)

(58) Field of Classification Search
CPC .. H04L 63/1425; H04L 63/1416; H04L 63/20
See application file for complete search history.

(56) References Cited

U.S. PATENT DOCUMENTS

| | | | |
|---|---|---|---|
| 7,380,205 B2 | 5/2008 | Bezrukov et al. |
| 7,457,792 B2 | 11/2008 | Weigt et al. |
| 7,457,793 B2 | 11/2008 | Weigt et al. |
| 7,457,794 B2 | 11/2008 | Weigt et al. |
| 7,624,092 B2 | 11/2009 | Lieske et al. |
| 7,756,808 B2 | 7/2010 | Weigt et al. |
| 7,756,809 B2 | 7/2010 | Weigt et al. |
| 7,761,396 B2 | 7/2010 | Weigt et al. |
| 7,783,723 B2 | 8/2010 | Peng et al. |
| 7,971,209 B2 | 6/2011 | Eberlein et al. |
| 8,051,034 B2 | 11/2011 | Mehta et al. |
| 8,661,103 B2 | 2/2014 | Mehta et al. |
| 8,775,671 B2 | 7/2014 | Rodeck et al. |
| 8,892,454 B2 | 11/2014 | Rabetge et al. |
| 8,954,602 B2 | 2/2015 | Seifert et al. |
| 9,037,678 B2 | 5/2015 | Mehta et al. |
| 9,075,633 B2 | 7/2015 | Nos |
| 9,116,906 B2 | 8/2015 | Nos et al. |
| 9,148,488 B2 | 9/2015 | Rabetge et al. |
| 9,251,011 B2 | 2/2016 | Meier et al. |

(Continued)

OTHER PUBLICATIONS

U.S. Appl. No. 15/639,907, filed Jun. 30, 2017, Pritzkau et al.

*Primary Examiner* — Sarah Su
(74) *Attorney, Agent, or Firm* — Fish & Richardson P.C.

(57) ABSTRACT

A first Event is identified from a normalized log persistency layer, where the first Event is associated with an attack on a computing system. A plurality of Events are fetched from the normalized log persistency layer, where each fetched Event correlates with its neighboring fetched Event by at least one correlation attribute, and each of the fetched Event and the first Event are presented on a graphical user interface as a chain of events. A workspace is generated, where the workspace comprises a series of attack paths, where each attack path corresponds to one Event in the chain of events. An ETD pattern is created based on the attack paths in the workspace.

20 Claims, 8 Drawing Sheets

(56) References Cited

U.S. PATENT DOCUMENTS

| | | | |
|---|---|---|---|
| 9,304,978 B2 | 4/2016 | Bezrukov et al. | |
| 9,348,665 B2 | 5/2016 | Storz et al. | |
| 9,838,419 B1* | 12/2017 | Fleyder | H04L 63/145 |
| 2013/0304665 A1 | 11/2013 | Rodeck et al. | |
| 2013/0304666 A1 | 11/2013 | Rodeck et al. | |
| 2013/0326079 A1 | 12/2013 | Seifert et al. | |
| 2015/0341389 A1* | 11/2015 | Kurakami | H04L 63/20 726/1 |
| 2015/0381637 A1* | 12/2015 | Raff | H04L 63/145 726/23 |
| 2017/0178025 A1* | 6/2017 | Thomas | G06N 5/025 |
| 2017/0178026 A1* | 6/2017 | Thomas | G06N 5/046 |
| 2018/0027010 A1* | 1/2018 | Pritzkau | H04L 63/1408 726/23 |
| 2018/0063167 A1* | 3/2018 | Rodeck | H04L 63/1416 |
| 2018/0234435 A1* | 8/2018 | Cohen | H04L 63/1416 |
| 2019/0007435 A1* | 1/2019 | Pritzkau | G06F 3/0482 |
| 2019/0130009 A1* | 5/2019 | McLean | H04L 63/1425 |
| 2019/0132344 A1* | 5/2019 | Lem | G06N 5/003 |
| 2019/0149570 A1* | 5/2019 | Nakata | H04L 63/145 726/23 |
| 2019/0190927 A1* | 6/2019 | Peng | H04L 63/1408 |
| 2019/0190935 A1* | 6/2019 | Peng | G06F 3/04842 |
| 2019/0340354 A1* | 11/2019 | Gamble | H04L 63/1416 |
| 2020/0044924 A1* | 2/2020 | Pritzkau | H04L 41/0893 |
| 2020/0128047 A1* | 4/2020 | Biswas | H04L 63/20 |
| 2020/0195680 A1* | 6/2020 | Pritzkau | H04L 67/02 |
| 2020/0280571 A1* | 9/2020 | Choi | H04L 63/1416 |

\* cited by examiner

PATTERN CREATION BASED ON AN ATTACK PATH

BACKGROUND

Enterprise threat detection (ETD) typically collects and stores a large amount of log data from various systems associated with an enterprise computing system. The stored log data is usually analyzed using statistical and forensic-type data analysis tools to identify suspicious behavior and to allow an appropriate response. In the statistical and forensic-type data analysis tools, semantic attributes based on normalized log fields are offered to search over logs, to create filters on the sematic attributes and to build patterns based on created filters. Once log fields meeting filter criteria arrive at a database, an alert can be created. A pattern is needed that allows recognition, creation of an alert on, or prevention of a cyber-attack.

SUMMARY

The present disclosure describes methods and systems, including computer-implemented methods, computer program products, and computer systems for creating a pattern based on an attack path in enterprise threat detection (ETD).

In an implementation, a first Event is identified from a normalized log persistency layer, where the first Event is associated with an attack on a computing system. A plurality of Events are fetched from the normalized log persistency layer, where each fetched Event correlates with its neighboring fetched Event by at least one correlation attribute, and each of the fetched Event and the first Event are presented on a graphical user interface (GUI) as a chain of events. A workspace is generated, where the workspace comprises a series of attack paths, where each attack path corresponds to one Event in the chain of events. An ETD pattern is created based on the attack paths defined in the workspace.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented so as to realize one or more of the following advantages. A created pattern can run automatically within ETD more efficiently than current threat detection methods. In addition, the created pattern allows recognition of a cyber-attack, to create an alert based on recognition of an attack, or to prevent an attack. The described subject matter helps to improve security of data stored and used in a computer system or between different computer systems. The described subject matter also defines a way of tracking and understanding a cyber-attack, allowing developers to generate a pattern that can automatically recognize similar attacks in the future and to alert system administrators about the attacks.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
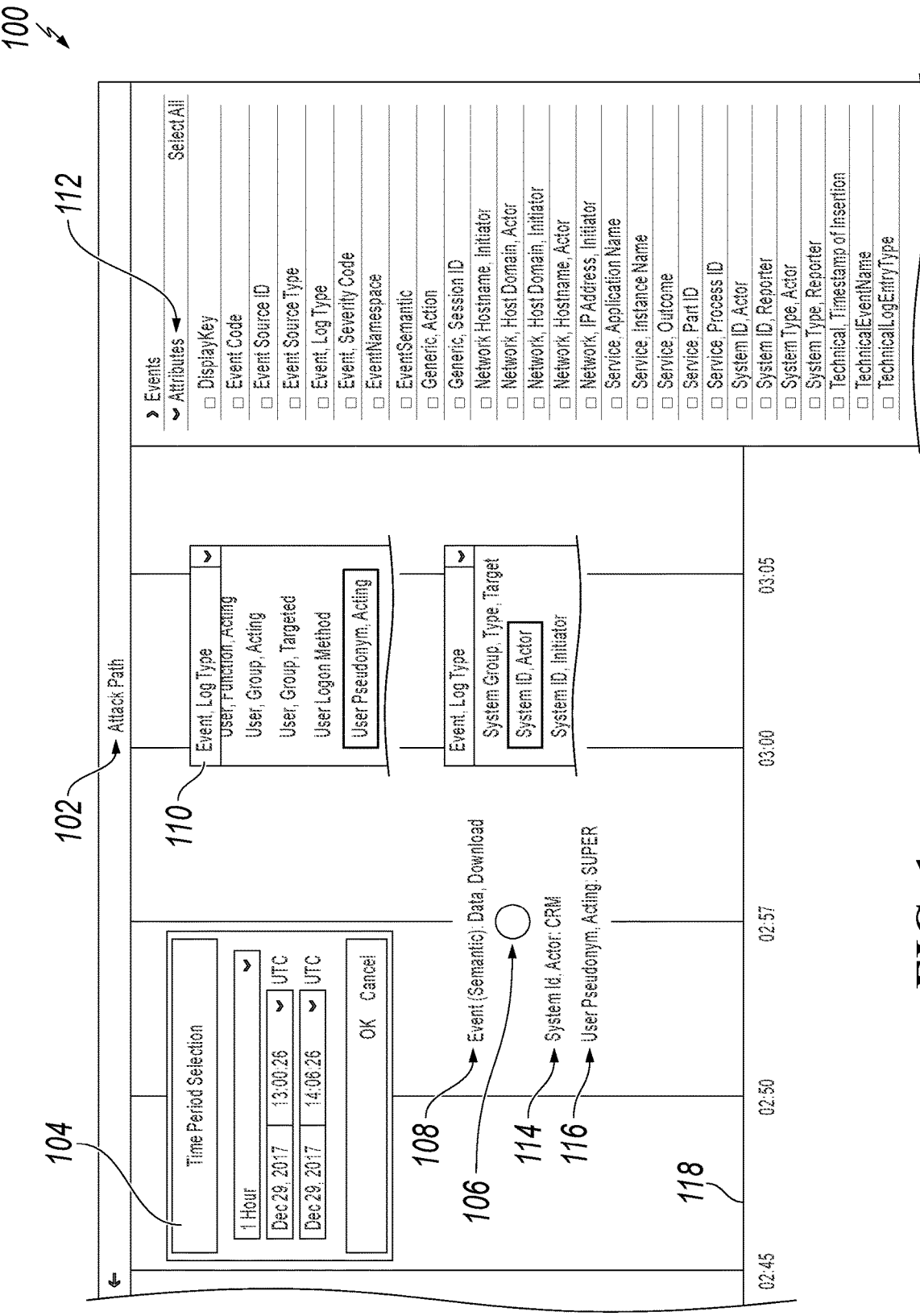
FIG. 1 is a screenshot of an example enterprise threat detection (ETD) Attach Path View user interface according to an implementation of the present disclosure

The following detailed description describes creating a pattern based on an attack Path and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Enterprise threat detection (ETD) typically collects and stores a large amount of real-time log data (often referred to as "big data") from various computing systems associated with an enterprise computing system to permit security of heterogeneous computing landscapes (for example, big data and other computing systems). The log data can be categorized into various heterogeneous entities, such as computing systems, users, servers, proxies, clients, firewalls, Internet Protocol (IP) address, host name, Media Access Control (MAC) address, and an event (or "Event"). An entity associated with an Event can also act with a certain assigned role(s) (for example, administrator, developer, and general user).

The log data can be analyzed computationally using statistical and forensic-type data analysis tools to identify suspicious behavior in reveal patterns, trends, interactions, and associations, especially those relating to ETD-type behavior. Appropriate responses can then be taken if malicious behavior is suspected or identified. In ETD, log data is typically written in several log persistencies by applications connected to an ETD system. These log entries are then read by an application interface associated with each application, converted into a particular format, and sent to the ETD system. Raw data is data produced by systems or applications. In some implementations, the raw data (for example, log entries) can be persisted in ETD in one database field as one binary large object (BLOB) or one STRING per log. In contrast, the content of each raw data log can be categorized/distributed into many different database fields when generating normalized log data. Each normalized log has additional database fields added with context information (for example, for a particular dynamic IP address, a device MAC address and host name can be saved).

An Event (for example, showing what type of action a user has performed) is a collection of semantic attributes taken from the fields of one log and additionally enriched with some type of context information. In a simplified way, Events and log data are the same entities, but Events are more human-readable. In a forensic lab environment, event types (semantic attributes) based on normalized log fields can be offered to search over logs, to create a series (that is, a "path") of one or more filters on the semantic attributes. ETD patterns for attack detection can be based on paths. When log data meeting the filter criteria described in an ETD pattern is detected, an alert can be granted for further investigation. Therefore, building of ETD patterns to automatically recognize a threat, generate an alert or event to prevent the threat from occurring, is needed to automatically detect threats and to support related ETD functions.

At a high-level, functionality of the present disclosure describes creating a new attack path discovery procedure based on a new application attack path, where the new procedure includes at least: 1) building an attack path, and 2) converting the attack path into a pattern that can run automatically within ETD. In the present disclosure, the attack path discovery procedure could start from any log written during an attack with some relation to the attack. For example, the log could be a final log, pointing to a time of the attack; a first log hint, pointing to a time of an initial logon of an attacker; or any other log that is generated at any time during the attack.

FIG. 1 is a screenshot of an example ETD Attack Path View user interface 100, according to an implementation of the present disclosure. As illustrated, and in typical implementations, an ETD main group user interface can include a plurality of selectable "tiles" to activate various functions related to ETD. For example, in FIG. 1, tile 102 is for an "Attack Path View." In other implementations, other tiles, for example, a "Forensic Lab" tile can also be selected. It should be noted that the illustrated tiles and user interfaces are provided as examples only, other functionalities and user interface configurations, as understood by one of ordinary skill in the art and consistent with the specification and claims, are also considered to be within the scope of the disclosure.

As illustrated on FIG. 1, user interface 100 permits a user to open a new Attack Path View 102 according to a particular time frame 104 and for a new Event 106 (here represented by a Dot in FIG. 1). On the right side of the user interface 100, an Attribute list 112 that contains a plurality of attributes associate with events are displayed. The Attribute list 112 can be configured to permit a user to select which attributes should be used for later discovery for correlating events. The Attribute list 112 contains semantic attributes associated with the events. Some technical attributes, such as Timestamp, can be configured, in some implementations, to not be displayed.

For the purpose of this disclosure, assume an attack was noticed at its completion (for example, by a log created on data download). A user selects the log in the Attack Path View by opening a new Event 106 "Event (Semantic)" that is associated with the log in the Attack Path View. In some implementations, for example, the log can also be first selected in another user interface, from where the Attack Path View could be navigated to). As illustrated in FIG. 1, the Event 106 has a value "Data, Download," which is displayed above the Event 106 as "Event (Semantic) Data, Download" 108. For the purpose of illustration, we will call Event 106 a "download" event in subsequent disclosure. The user can select to display, from a pulldown window 110, multiple attributes of interests associated with Event 106. In this example, two attributes of interests "User Pseudonym, Acting 116" and "System ID, Actor 114" are selected and displayed. Values corresponding to the selected attributes are also displayed below the Event 106 as "SUPER and "CRM", respectively. User, System, Hostname and IP addresses are among the most common attributes associated with an Event. For example, when dealing with the event "Download of the data," the developers first would want to know "who downloaded the data" and "where the event occurred." Therefore, in this case, attributes "User" and "System" are first selected. In some implementations, for example, the user can select other attributes to view their associated values.

A timeline 118 is displayed at the bottom of user interface 100. Timeline 118 provides chronological context for when Events occurred. For example, Event 106 occurred at 02:57.

Figure 2:
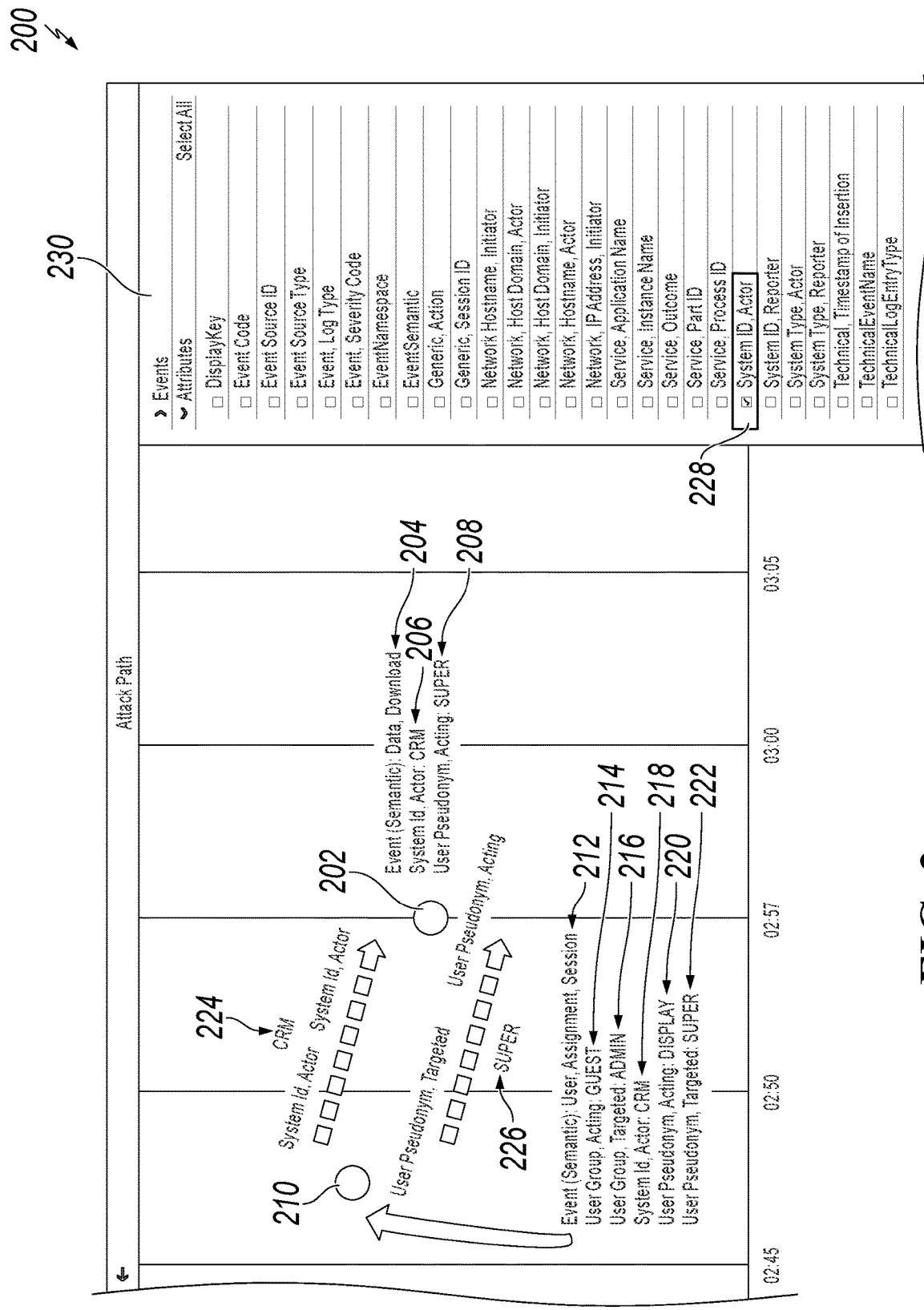
FIG. 2 is a screenshot of an example ETD Attach Path View user interface illustrating a search for a correlating Event, according to an implementation of the present disclosure.

FIG. 2 is a screenshot of an example ETD Attack Path View user interface 200 illustrating a search for a correlating Event, according to an implementation of the present disclosure. For example, after a particular "download" event has happened, a user can start discovering over all logs within ETD for a next event having something in common with the particular "download" event in order to discover an event that correlates to the particular "download" event. In the present disclosure, two Events are considered to correlate with each other if the events have something in common. For example, Event A has an attribute "Source System ID" with the value "ABC," while Event B has the same value "ABC" for its attribute "Target System Id." In this case, Event A and Event B would be considered to correlate to each other on Source System ID and Target System ID. In some implementations, for example, correlation attributes could be the same Session ID, the same Correlation ID, the same User, the same System, the same Host (MAC or IP Address), or some other value that demonstrates a relationship between two events. In some implementations, for example, the particular "download" event can correlate with another event with several attributes. In the present disclosure, the "download" event is assumed to appear to be the last event on the time scale in the example, and for illustration purposes, the search on the events with timestamps earlier than the timestamp of the "download" event is restricted. In some implementations, if there are too many events with the same attribute values, the user can also restrict the type of attributes the user can select for correlation. For example, a user can be restricted to be able to only select attributes determined to be the most relevant, such as User, System ID, Session ID, or Correlation ID, in addition to a restriction to an observed time frame.

As illustrated in FIG. 2, the particular "download" Event 202 (corresponding to Event 108 of FIG. 1) is displayed on the user interface 200. The event value "Data, Download 204", and other attributes associated with Event 202 are also displayed next to the Event 202. For example, attributes "System ID, Actor 206" and "User Pseudonym, Acting 208" are displayed next to Event 202, associated with values "CRM" and "SUPER," respectively.

On the right side of the user interface 200, attribute "System ID, Actor 220" is selected from the Attribute list 228 as a correlation attribute for the user to search for the correlating event of Event 202. Event 210, with a timestamp earlier than Event 202, and also meeting the search criteria (that is, contains the correlation attribute) is found and also displayed on the user interface 200 as a correlating event, Event 202. It can be seen from FIG. 2, Event 210 has an event value "User Assignment, Session 212". Several attributes associated with Event 210 are also displayed next to the Event 210. For example, attributes "User Group, Acting 214", "User Group, Targeted 216", "System ID, Actor 218", "User Pseudonym, Actor 220", and "User Pseudonym, Targeted 222" are displayed next to Event 210, with associated values "GUEST," "ADMIN," "CRM," "DISPLAY," and "SUPER," respectively. FIG. 2 also shows that the Event 210 occurred a short time before Event 202 and has correlation attributes, "System ID, Actor" (with value "CRM") and the same "User Pseudonym, Target/Acting" (with value "SUPER") with Event 202. The values associated with the correlation attributes, CRM 224 and SUPER 226 are displayed on the connection arrow line between the two dots that represent Event 202 and Event 210.

As correlating events that have the same value "CRM" for the same attribute "System ID, Actor," Event 212 has an event value "User, Assignment, Session," while a later Event 202 has an event value "Data, download." Thus, the found Event 212 shows a "user switch" and shows that a User gained more authority by changing a User destination from "Assignment, Session" to "Data, download." In some implementations, for example, such types of "user switch" is performed over RFC (Hypertext Transfer Protocol) or HTTP. The "user switch" from Event 210 to Event 202 afforded additional authority to a new user by permitting the new user to download data, increasing the possibility of security breach.

From FIG. 2, it also can be seen, that the user under which the first log was protocolled (Event 212) was "DISPLAY", and that the user under which the second log was protocolled was "SUPER." This shows when the attacker first logged into the system, the attacker was under User "DISPLAY," which has very weak authorization. Then the attacker managed to switch the User to "SUPER," which has very powerful authorization and is able to conduct critical actions in the system, such as downloading data.

A timeline 232 (corresponding to timeline 118 of FIG. 1 and also timeline 330 of FIG. 3) is displayed at the bottom of user interface 200. Timeline 232 provides chronological context for when Events occurred. For example, Event 202 occurred at 02:57, while Event 210 occurs earlier in time.

Figure 3:
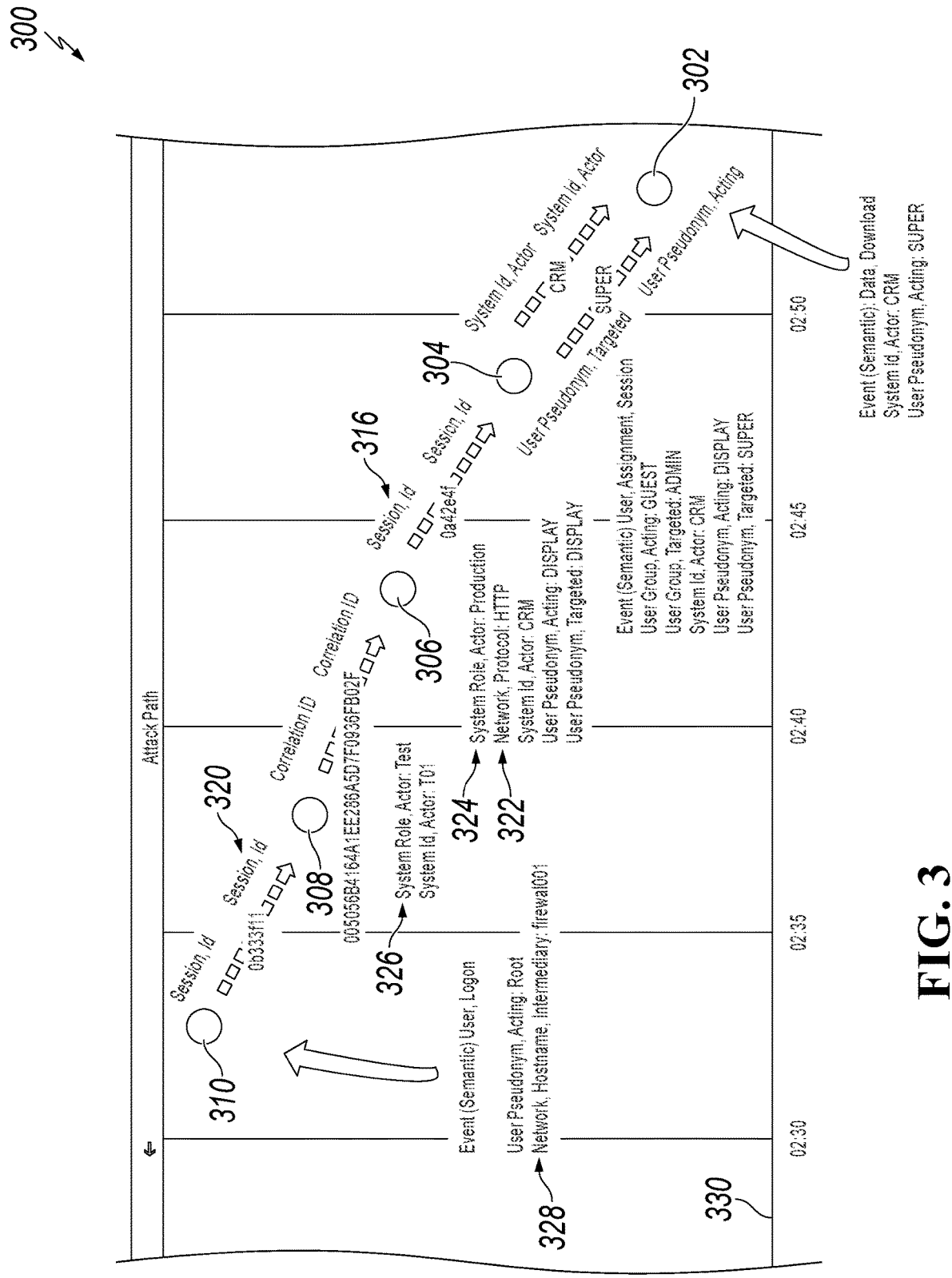
FIG. 3 is a screenshot of an example ETD pattern Attach Path View user interface illustrating functionality to search and to select Events, according to an implementation of the present disclosure.

FIG. 3 is a screenshot of an example ETD Attack Path View user interface 300 illustrating functionality to search and to select correlating Events, according to an implementation of the present disclosure. After finding that Event 304 correlates to Event 302 (corresponding to Event 108 of FIG. 1 and Event 202 of FIG. 2) (process as detailed in the illustration of FIG. 2), the user can search for more events having something in common with Event 304 (corresponding to Event 210 of FIG. 2). Three other correlating events (that is, Event 306, Event 308, and Event 310) are found and displayed on the user interface 300, with each event having a timestamp earlier than the one found immediately before it. For example, the Event 304 occurred between 02:50 and 02:45, while Event 306 occurred prior to 02:45. Correlation attributes are shown on a connection arrow between each of two neighboring events.

As illustrated in FIG. 3, Event 304 and Event 306 correlate to each other by a correlation attribute "Session ID" 316. The attribute "Network Protocol" 322 of Event 306 has a value "HTTP," indicating that Event 304 occurs within the same Session ID, and there was a Web Service Call over HTTP (non-secure protocol) initiated during that session. Further, Event 308 and Event 306 correlate with each other by correlation attribute "Correlation ID," where the attribute "System Role, Actor" 324 of Event 306 has a value "Production," and attribute "System Role, Actor" 326 of Event 308 has a value "Test." The change of the System role from Event 308 to Event 306 shows that there was a connection from a Test system to a Production system, and an attacker jumped to the productive (sensible) business system over the connection. Finally, Event 310 and Event 308 correlate to each other by correlation attribute "Session ID" 320, and attribute "Network Hostname, Intermediary" 328 of Event 310 has a value "firewal001." This shows that Event 310 occurs within the same Session ID, and there was a call through a firewall initiated during that session, as the Hostname of the Intermediary Server of the firewall was protocolled in the event.

As such, a chain of events is created, where each of the event has at least one correlation attribute to its neighboring event. Events in the chain of event are ordered on a time scale.

A timeline 330 (corresponding to timeline 118 of FIG. 1 and timeline 232 of FIG. 2) is displayed at the bottom of user interface 300. Timeline 330 provides chronological context for when Events occurred. For example, Event 302 occurred at 02:57, while Events 304, 306, 308, and 310 occur earlier in time.

Figure 4:
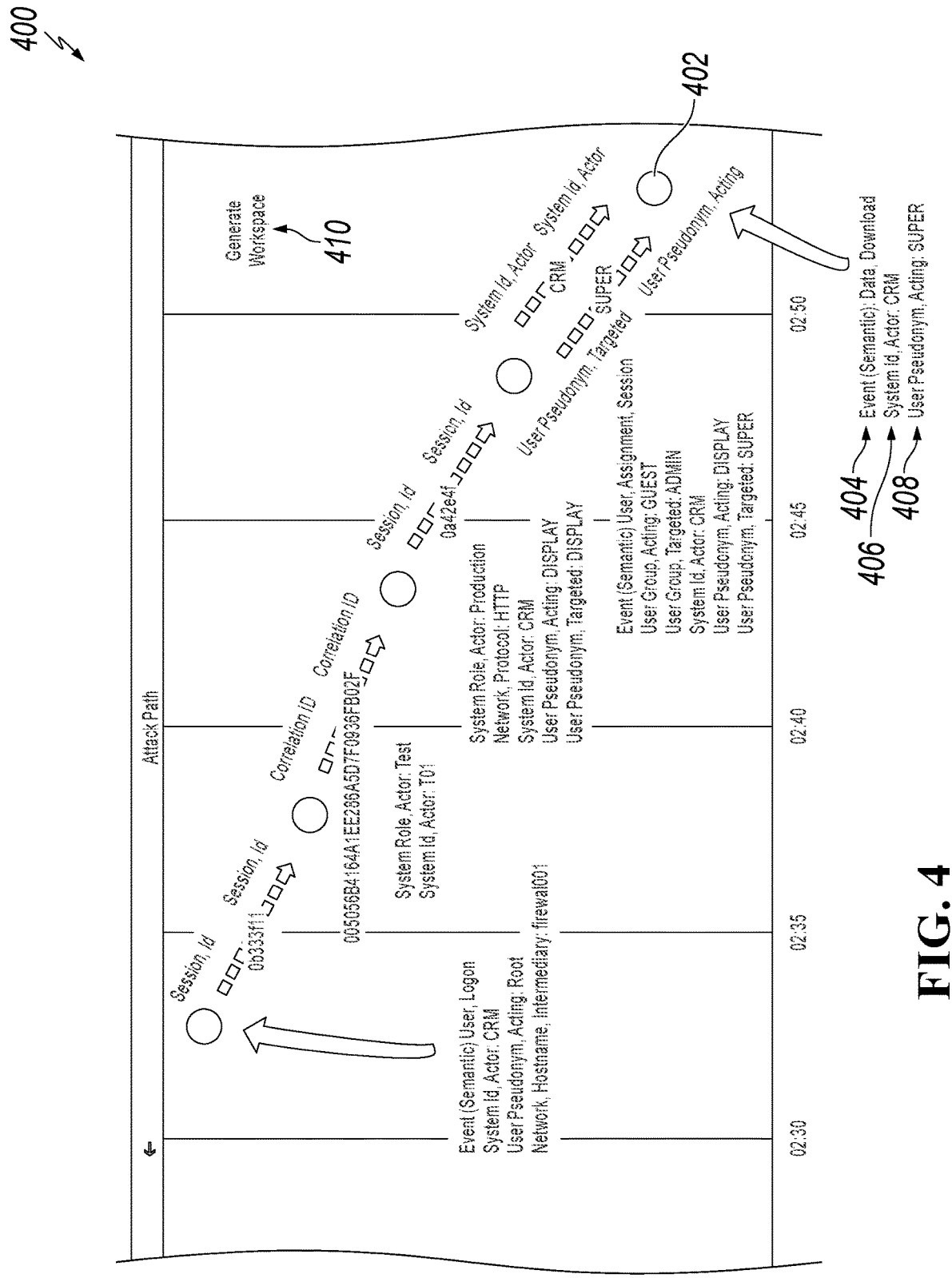
FIG. 4 is a screenshot of an example ETD Attach Path View user interface illustrating functionality to generate a workspace by using events from the chain of events, according to an implementation of the present disclosure.

FIG. 4 is a screenshot of an example ETD Attack Path View user interface 400 illustrating functionality to generate a workspace by using events from the chain of Events, according to an implementation of the present disclosure. A chain of events where each event correlates to each other can be generated in the forensic lab of the ETD. Each event is presented in the forensic lab by a path containing one or more subsets that allow identification of events as precisely as necessary, and to create correlations with other paths. For the purposes of illustration, a path comprises multiple filters. Generation of a workspace containing such a path can be done programmatically.

To generate the workplace, the user can first select attributes and correlations that should be used for the workspace. Attributes of the each Event can be displayed. For example, attributes of Event 402 can include, and are not limited to "Event (Semantic)" 404, "System ID, Actor" 406, and "User Pseudonym, Acting" 408. Selected attributes can be highlighted or distinguished of non-selected attributes (such as, by enlarging, changing color, etc.). For correlations, attributes having specific value, such as attributes like "Session ID," "User Pseudonym, Acting," or "TimeStamp" can be selected. In this example, for filters, generic attributes, such as "System Role" or "User Group" can be selected. Attributes that are selected for generating the workspace are marked bold in FIG. 4.

In some implementations, a time dependency is generated automatically, as events are already ordered on a time scale. By selecting the button "generate workspace", a workspace corresponding to a designed Attack Path can be created.

Figure 5:
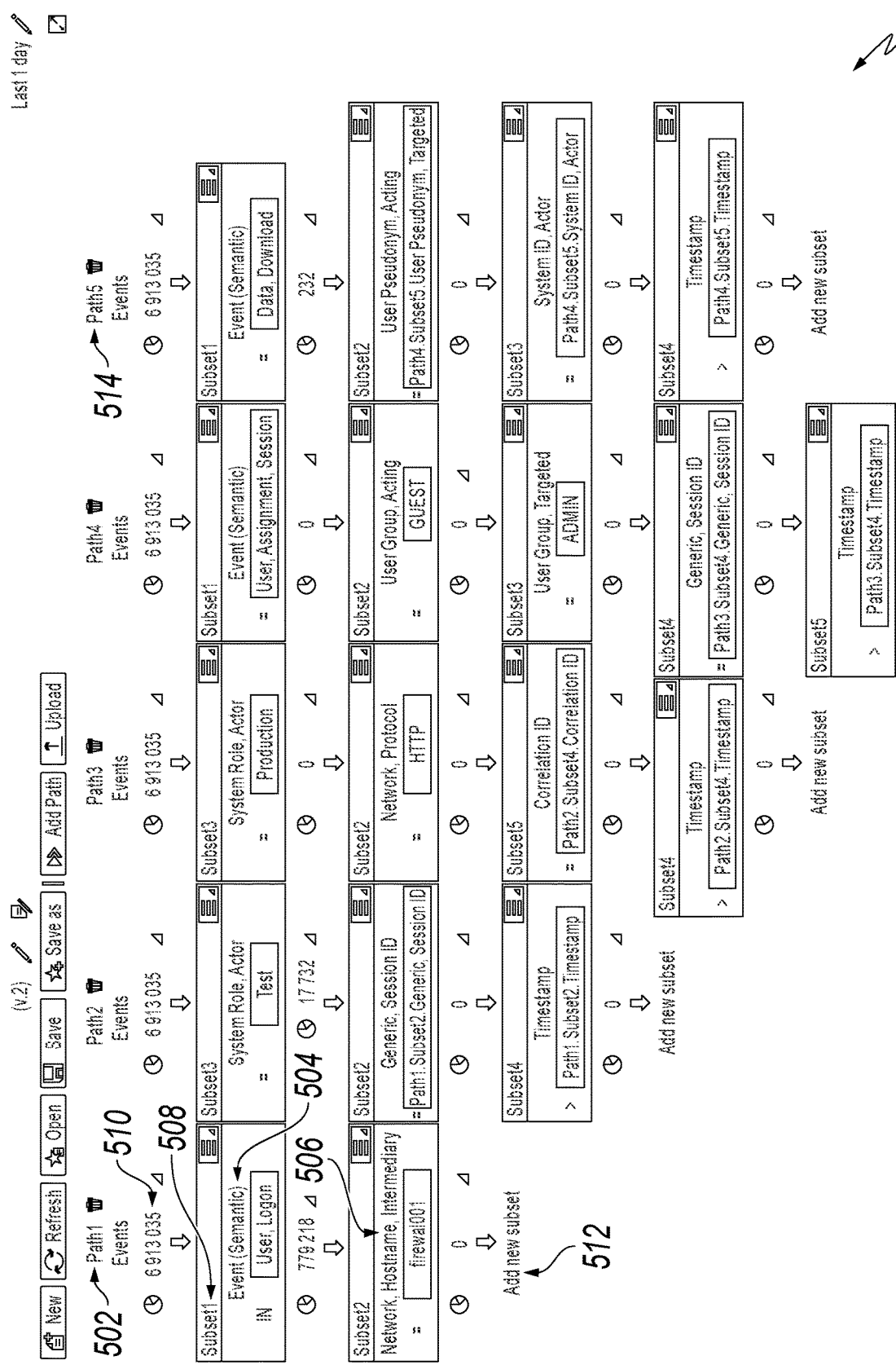
FIG. 5 is a screenshot of an example ETD Forensic Lab user interface illustrating functionality to create a pattern corresponding to designed attack path, according to an implementation of the present disclosure.

FIG. 5 is a screenshot of an example ETD Forensic Lab View user interface 500 illustrating functionality to create a pattern corresponding to designed attack path, according to an implementation of the present disclosure.

As illustrated in FIG. 5, using attributes and correlations from FIG. 4, a workspace corresponding to a chain of events proving an attack is created. Each path in the Forensic Lab View corresponds to an Event in the Attack Path View. For the purpose of this disclosure, a path contains a series of filters. Starting with a "complete" set of log data (a particular chosen data source) for analysis, after creating a path, a particular subset of log data under analysis should remain. The application of a new filter in a path results in a new subset, which is necessarily at least equal to or smaller than a previous set/subset. Multiple logs can be analyzed in a single path. A sequence of filters can be stored (as well as opened, edited, or deleted) in an ETD workspace. For example, in Path 1 502, the filter is "Event (Semantic) 504," "Network, Hostname, Intermediary 506." Correlation between subsets are generated out for correlations between events. An overall count of the number available events is displayed next to each filter. For example, Subset 1 508 of Path 1 502 is directed to and displays the dimension "Event (Semantic) 6913035 510" meaning there is a count of 6913035 Semantic Event values in the overall 6913035 log event count. In typical implementations, the overall count is also selectable (note, small arrow to the lower right of the count number). By clicking the small arrow, a pulldown is shown that allows the creation of a pattern, creation of a chart, or display of raw data of the current subset. Selecting the "Add new subset" link 512 allows the user to add an additional filter. Notice that Path 5 514 is longer due to the addition of additional filters. Note that as selections are made consistent with FIGS. 1-4, the level of available log data for review is reduced to the additionally added filters.

Figure 6:
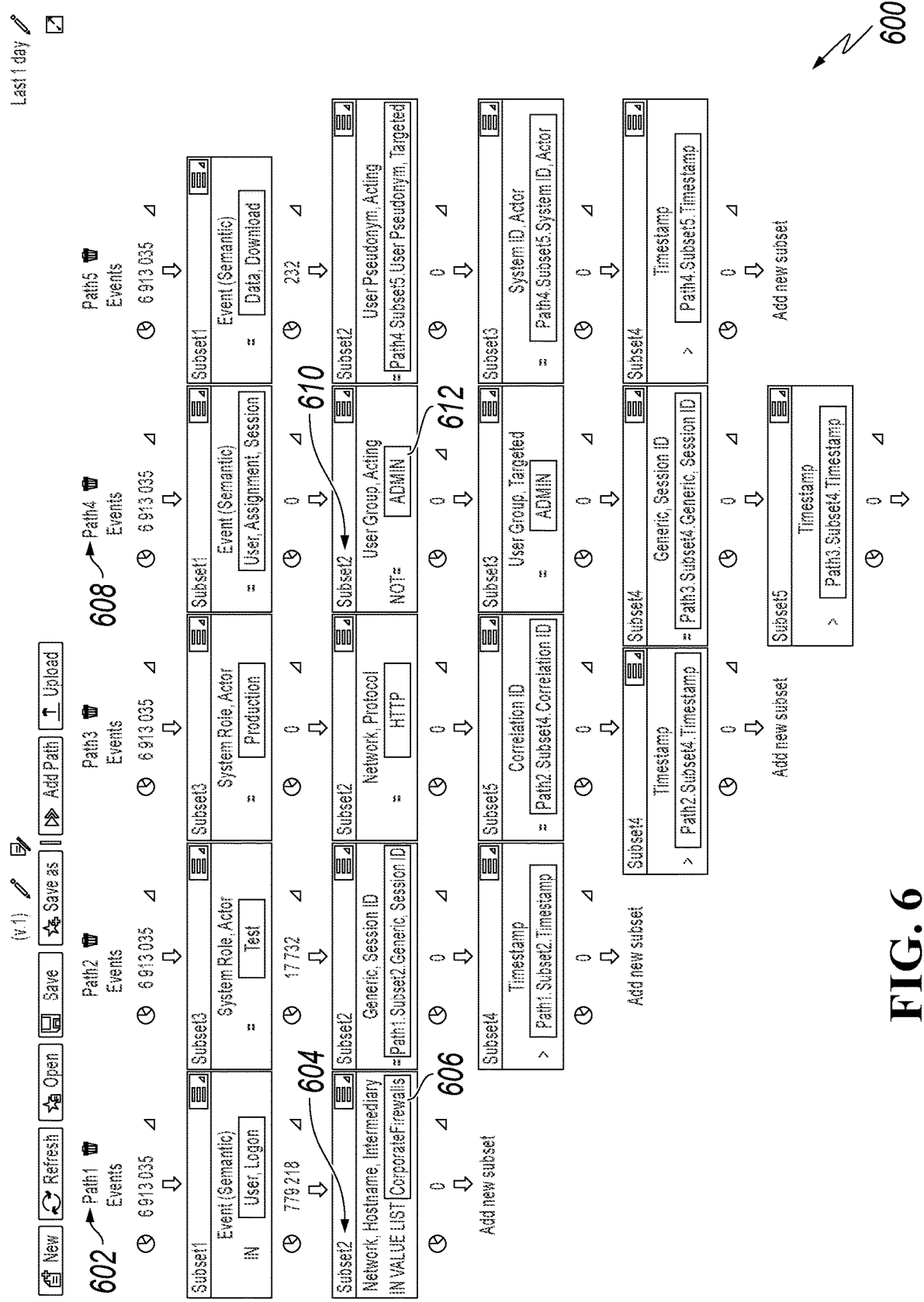
FIG. 6 is a screenshot of an example ETD Forensic Lab user interface illustrating functionality to elaborate a workspace by adjusting filters, according to an implementation of the present disclosure.

FIG. 6 is a screenshot of an example ETD Forensic Lab user interface 600 illustrating functionality to elaborate a workspace by adjusting filters, according to an implementation of the present disclosure. After the workspace is generated, the user can manually expand the workspace by adding more filters, making filtering more precise and improving the performance of an underlying structures query language (SQL) statement associated with a pattern.

As illustrated in FIG. 6, for example, the Subset 2 604 of the Path 1 602 contained a specific firewall value "firewal001" (as shown in FIG. 5). A user can change this specific value to "CorporateFirewalls" 606 which is a configurable list of all Corporation Firewalls, to consider only hosts where firewalls are running. The change of the filter criteria broaden the range of available events to select. As another example, the Subset 2 610 of the Path 4 608 had the value "Guest" (as shown in FIG. 5), and the user can change this value to "NOT ADMIN" 612, to make this pattern user-independent and more general.

As such, a pattern is created for the workspace, and a time period can be adjusted to let the pattern run periodically. ETD patterns are data objects saved in JSON format in a pattern persistency. ETD patterns contain paths. Each path contains subsets, which represent WHERE conditions (for example "filter only systems A, B, and C" or "do not consider IP addresses starting with ".10," etc.). Paths can be connected over references (which are represented by JOINS). Each pattern is translated into a SQL query, meaning that a pattern execution is a SQL query execution. Alerts are matching pattern results or query execution results. The created pattern can be translated into an SQL statement with a JOIN condition for each correlation. The non-correlation filter values are translated into a WHERE condition in the SQL statement. The created pattern can also run based on triggering framework to react to an attack in real-time.

Executing the created pattern can generate an alert, and further actions could be taken automatically in response to that alert. For example, after the alerted is generated, a user account under which an attacker logged in can be locked, a corresponding computer system can be shut down, a corresponding user session can be terminated, or experts can be notified for detailed investigation.

To illustrate how the created pattern can detect log events raising an ETD alert, an example with the created pattern in FIGS. 5-6 is described as follows. In a particular example, the created pattern can be scheduled and run automatically in the ETD system. If the executed pattern detects, based on monitored log data, that possible malicious activity (such as, an attack) has occurred, an alert and notification (for example, to users, monitoring algorithms, or computer systems) can be generated concerning possible malicious activity matching the pattern. Detailed information provided by the generated alert and notification can assist in efficient analysis of the possible malicious activity.

It is noteworthy to mention, that in the illustrated example, as shown in FIGS. 1-4, an attacker first gained access to a Test system, then used a non-secure HTTP protocol to access a Production system. In the production system, the attacker gained more authority and was permitted to download secure data. The purpose of this example is not to describe a real attack, but to illustrate the procedure of how an attack path and associated pattern could be generated. An attacker can only be able to download secure data if the system he accessed is insecure. Therefore, once a security leak is identified, corresponding actions should be taken immediately. In practice, the same type of security leak can occur repeatedly, for example, in other landscapes or on other systems due to missing knowledge or due insufficient security awareness of system users or administrators. Therefore, an enhanced ETD with its periodic or triggered patterns can add additional protection for known attack patterns, by allowing analysis of data from various enterprise computing systems over known ETD patterns indicating threats to the computing systems. While the present disclosure focuses on the use of log data for analysis, other types of data associated with ETD computing systems can also be leveraged for ETD analysis using the described subject matter.

Figure 7:
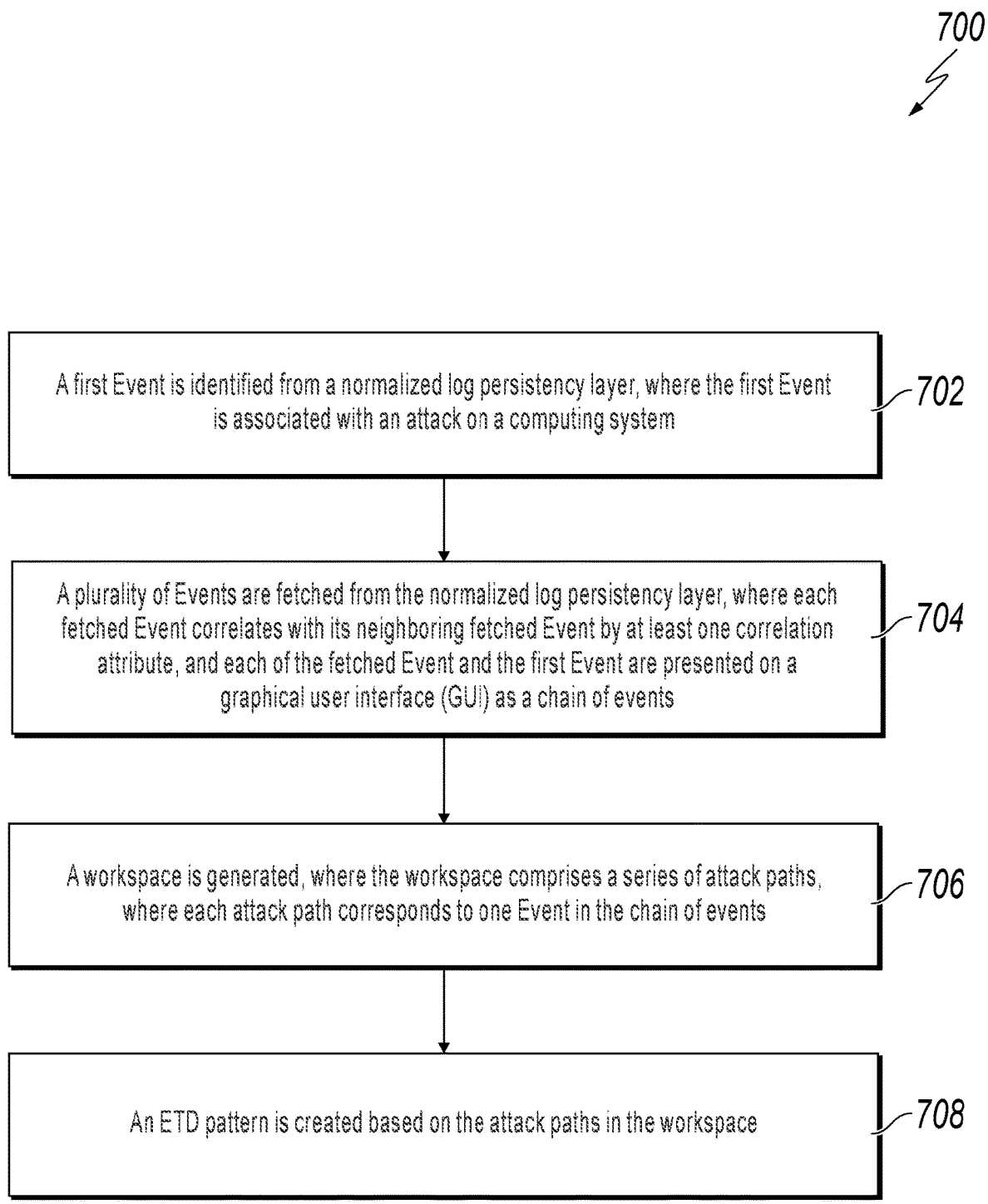
FIG. 7 is a flowchart illustrating an example of a computer-implemented method for creating a pattern based on an attack path, according to an implementation of the present disclosure.

FIG. 7 is a flowchart illustrating an example of a computer-implemented method for creating a pattern based on an attack path, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 600 can be run in parallel, in combination, in loops, or in any order.

At 702, a first Event is identified from a normalized log persistency layer, where the first Event is associated with an attack on a computer system. In some implementations, the first Event is associated with a noticed log in an Attack Path View, wherein the noticed log is noticed during an attack on a computing system. In some implementations, for example, one or more log files are loaded from a normalized log persistency layer into an Attack Path View for ETD analysis, wherein each log file contains logged Events associated with one or more entities. From 702, method 700 proceeds to 704.

At 704, a plurality of Events are fetched from the normalized log persistency layer, wherein each fetched Event of the plurality of Events correlates with its neighboring fetched Event by at least one correlation attribute, and each of the fetched Event and the first Event can be presented on a graphical user interface (GUI) as a chain of events. Events are considered to be correlated with each other when having at least one correlation attribute. In some implementations, correlation attributes of two events can be the same attributes for both events and the attributes are associated with the same value for each event. In some implementations, correlation attributes of two events can be different attributes for each event but having the same value. In some implementations, for example, the fetching can be restricted to a time range. In some implementations, for example, the fetching can be restricted by at least one attribute type when there are too many correlation attributes. In some implementations, for example, the chain of events will be presented in order on a time scale. From 704, method 700 proceeds to 706.

At 706, a workspace is generated, wherein the workspace comprises a series of attack paths, and wherein each attack path corresponds to an Event in the chain of events. In some implementations, for example, each path of the generated workspace contains multiple subsets, and each subset corresponding to a filter with a value. In some implementations, the subset can contain either a correlation attribute or an attribute associated with a Event. These correlation attributes and attributes are selected from each event of the chain of event. Among which, the correlation attributes are selected from attributes with specific value, while the generic attributes associated with Events are selected as filters. The generated workspace can be further refined by adjusting the value associated with at least one filter. From 706, method 700 proceeds to 708.

At 708, an enterprise threat detection (ETD) pattern is created based on the attack paths in the workspace. In some implementations, for example, executing the created ETD pattern can generate an alert when a log file meeting at least one filter value is detected. After 708, method 700 stops.

Figure 8:
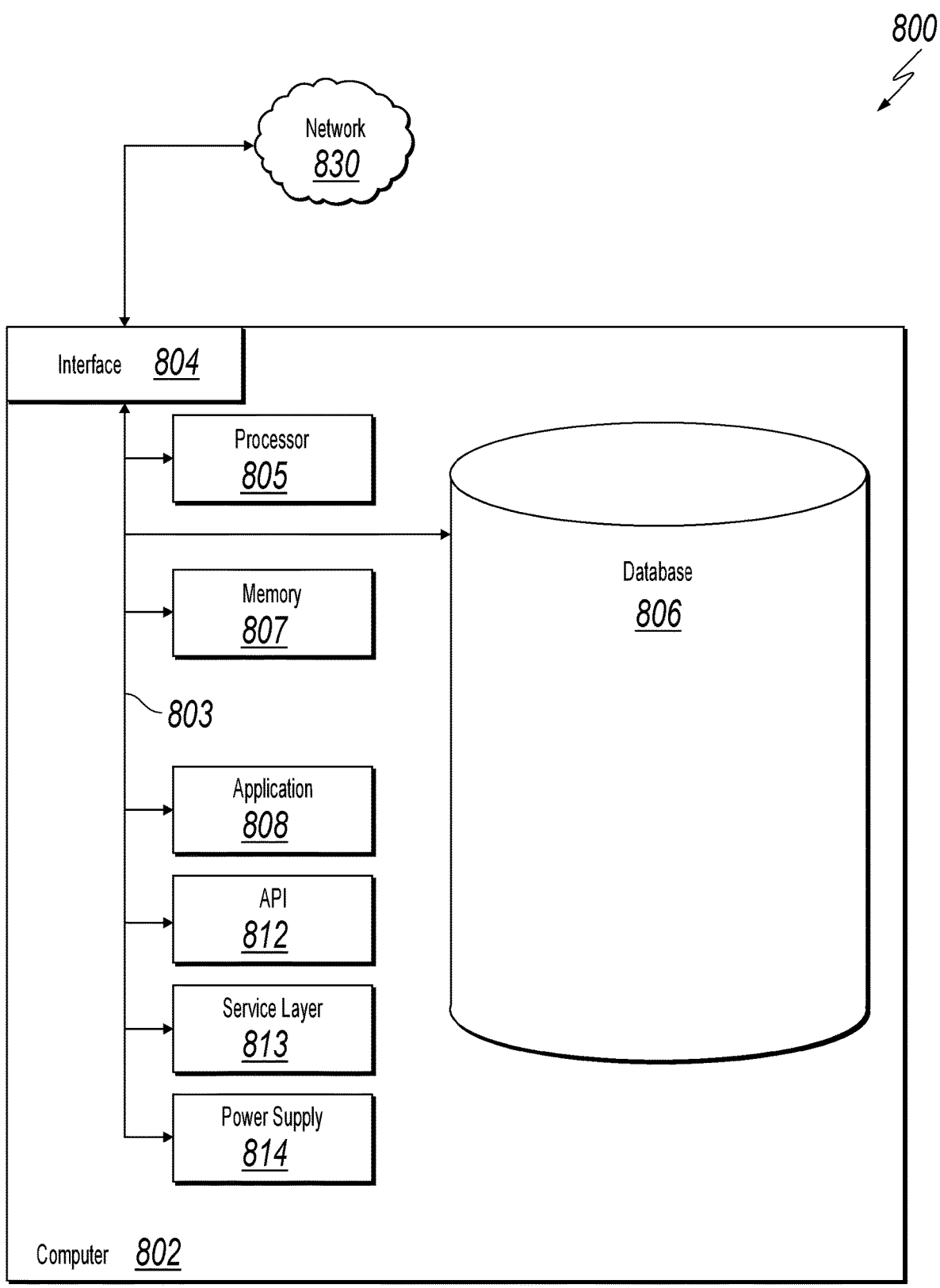
FIG. 8 is a block diagram illustrating an example of a computer-implemented system used to provide computational functionalities associated with described algorithms, methods, functions, processes, flows, and procedures, according to an implementation of the present disclosure.

FIG. 8 is a block diagram illustrating an example of a computer-implemented system used to provide computational functionalities associated with described algorithms, methods, functions, processes, flows, and procedures, according to an implementation of the present disclosure. In the illustrated implementation, System 800 includes a Computer 802 and a Network 830.

The illustrated Computer 802 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 802 can include an input device, such as a keypad, keyboard, touch screen, another input device, or a combination of input devices that can accept user information, and an output device that conveys information associated with the operation of the Computer 802, including digital data, visual, audio, another type of information, or a combination of types of information, on a graphical-type user interface (UI) (or GUI) or other UI.

The Computer 802 can serve in a role in a distributed computing system as a client, network component, a server, a database or another persistency, another role, or a combination of roles for performing the subject matter described in the present disclosure. The illustrated Computer 802 is communicably coupled with a Network 830. In some implementations, one or more components of the Computer 802 can be configured to operate within an environment, including cloud-computing-based, local, global, another environment, or a combination of environments.

At a high level, the Computer 802 is an electronic computing device operable to receive, transmit, process, store, or manage data and information associated with the described subject matter. According to some implementations, the Computer 802 can also include or be communicably coupled with a server, including an application server, e-mail server, web server, caching server, streaming data server, another server, or a combination of servers.

The Computer 802 can receive requests over Network 830 (for example, from a client software application executing on another Computer 802) and respond to the received requests by processing the received requests using a software application or a combination of software applications. In addition, requests can also be sent to the Computer 802 from internal users (for example, from a command console or by another internal access method), external or third-parties, or other entities, individuals, systems, or computers.

Each of the components of the Computer 802 can communicate using a System Bus 803. In some implementations, any or all of the components of the Computer 802, including hardware, software, or a combination of hardware and software, can interface over the System Bus 803 using an application programming interface (API) 812, a Service Layer 813, or a combination of the API 812 and Service Layer 813. The API 812 can include specifications for routines, data structures, and object classes. The API 812 can be either computer-language independent or dependent and refer to a complete interface, a single function, or even a set of APIs. The Service Layer 813 provides software services to the Computer 802 or other components (whether illustrated or not) that are communicably coupled to the Computer 802. The functionality of the Computer 802 can be accessible for all service consumers using the Service Layer 813. Software services, such as those provided by the Service Layer 813, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 802, alternative implementations can illustrate the API 812 or the Service Layer 813 as stand-alone components in relation to other components of the Computer 802 or other components (whether illustrated or not) that are communicably coupled to the Computer 802. Moreover, any or all parts of the API 812 or the Service Layer 813 can be implemented as a child or a sub-module of another software module, enterprise application, or hardware module without departing from the scope of the present disclosure.

The Computer 802 includes an Interface 804. Although illustrated as a single Interface 804, two or more Interfaces 804 can be used according to particular needs, desires, or particular implementations of the Computer 802. The Interface 804 is used by the Computer 802 for communicating with another computing system (whether illustrated or not) that is communicatively linked to the Network 830 in a distributed environment. Generally, the Interface 804 is operable to communicate with the Network 830 and includes logic encoded in software, hardware, or a combination of software and hardware. More specifically, the Interface 804 can include software supporting one or more communication protocols associated with communications such that the Network 830 or hardware of Interface 804 is operable to communicate physical signals within and outside of the illustrated Computer 802.

The Computer 802 includes a Processor 805. Although illustrated as a single Processor 805, two or more Processors 805 can be used according to particular needs, desires, or particular implementations of the Computer 802. Generally, the Processor 805 executes instructions and manipulates data to perform the operations of the Computer 802 and any algorithms, methods, functions, processes, flows, and procedures as described in the present disclosure.

The Computer 802 also includes a Database 806 that can hold data for the Computer 802, another component communicatively linked to the Network 830 (whether illustrated or not), or a combination of the Computer 802 and another component. For example, Database 806 can be an in-memory, conventional, or another type of database storing data consistent with the present disclosure. In some implementations, Database 806 can be a combination of two or more different database types (for example, a hybrid in-memory and conventional database) according to particular needs, desires, or particular implementations of the Computer 802 and the described functionality. Although illustrated as a single Database 806, two or more databases of similar or differing types can be used according to particular needs, desires, or particular implementations of the Computer 802 and the described functionality. While Database 806 is illustrated as an integral component of the Computer 802, in alternative implementations, Database 806 can be external to the Computer 802. As illustrated, the databased 806 contains a forensic workspace 514, and Events 516.

The Computer 802 also includes a Memory 807 that can hold data for the Computer 802, another component or components communicatively linked to the Network 830 (whether illustrated or not), or a combination of the Computer 802 and another component. Memory 807 can store any data consistent with the present disclosure. In some implementations, Memory 807 can be a combination of two or more different types of memory (for example, a combination of semiconductor and magnetic storage) according to particular needs, desires, or particular implementations of the Computer 802 and the described functionality. Although illustrated as a single Memory 807, two or more Memories 807 or similar or differing types can be used according to particular needs, desires, or particular implementations of the Computer 802 and the described functionality. While Memory 807 is illustrated as an integral component of the Computer 802, in alternative implementations, Memory 807 can be external to the Computer 802.

The Application 808 is an algorithmic software engine providing functionality according to particular needs, desires, or particular implementations of the Computer 802, particularly with respect to functionality described in the present disclosure. For example, Application 808 can serve as one or more components, modules, or applications. Further, although illustrated as a single Application 808, the Application 808 can be implemented as multiple Applications 808 on the Computer 802. In addition, although illustrated as integral to the Computer 802, in alternative implementations, the Application 808 can be external to the Computer 802.

The Computer 802 can also include a Power Supply 814. The Power Supply 814 can include a rechargeable or non-rechargeable battery that can be configured to be either user- or non-user-replaceable. In some implementations, the Power Supply 814 can include power-conversion or management circuits (including recharging, standby, or another power management functionality). In some implementations, the Power Supply 814 can include a power plug to allow the Computer 802 to be plugged into a wall socket or another power source to, for example, power the Computer 802 or recharge a rechargeable battery.

There can be any number of Computers 802 associated with, or external to, a computer system containing Computer 802, each Computer 802 communicating over Network 830. Further, the term "client," "user," or other appropriate terminology can be used interchangeably, as appropriate, without departing from the scope of the present disclosure. Moreover, the present disclosure contemplates that many users can use one Computer 802, or that one user can use multiple computers 802.

Described implementations of the subject matter can include one or more features, alone or in combination.

For example, in a first implementation, a computer-implemented method, comprising: identifying, from a normalized log persistency layer, a first Event, wherein the first Event is associated with an attack on a computing system; fetching, from the normalized log persistency layer, a plurality of Events, wherein each fetched Event correlates with its neighboring fetched Event by at least one correlation attribute; and presenting each of the fetched Event and the first Event on a graphical user interface as a chain of events; generating a workspace, wherein the workspace comprises a series of attack paths, wherein each attack path corresponds to one Event in the chain of events; and creating an enterprise threat detection (ETD) pattern based on the attack paths in the workspace.

The foregoing and other described implementations can each, optionally, include one or more of the following features:

A first feature, combinable with any of the following features, wherein the first Event is associated with a noticed log in an Attack Path View, and wherein the noticed log is noticed during an attack on a computing system.

A second feature, combinable with any of the previous or following features, wherein the chain or events comprises multiple events ordering on a time scale.

A third feature, combinable with any of the previous or following features, wherein the paths associated with the generated workspace correlate with each other.

A fourth feature, combinable with any of the previous or following features, wherein each path of the workspace comprises multiple subsets, and wherein each subset corresponding to a filter with a value.

A fifth feature, combinable with any of the previous or following features, wherein each path of the workspace by adjusting the value associated with at least one filter.

A sixth feature, combinable with any of the previous or following features, wherein the method further comprising executing the created ETD pattern and generating an alert when a log file meeting at least one filter value is detected.

In a second implementation, a non-transitory, computer-readable medium storing one or more instructions executable by a computer system to perform operations comprising: identifying, from a normalized log persistency layer, a first Event, wherein the first Event is associated with an attack on a computing system; fetching, from the normalized log persistency layer, a plurality of Events, wherein each fetched Event correlates with its neighboring fetched Event by a at least one correlation attribute; and presenting each of the fetched Event and the first Event on a graphical user interface as a chain of events; generating a workspace, wherein the workspace comprises a series of attack paths, wherein each attack path corresponds to one Event in the chain of events; and creating an enterprise threat detection (ETD) pattern based on the attack paths in the workspace.

The foregoing and other described implementations can each, optionally, include one or more of the following features:

A first feature, combinable with any of the following features, wherein the first Event is associated with a noticed log in an Attack Path View, and wherein the noticed log is noticed during an attack on a computing system.

A second feature, combinable with any of the previous or following features, wherein the chain or events comprises multiple events ordering on a time scale.

A third feature, combinable with any of the previous or following features, wherein the paths associated with the generated workspace correlate with each other.

A fourth feature, combinable with any of the previous or following features, wherein each path of the workspace comprises multiple subsets, and wherein each subset corresponding to a filter with a value.

A fifth feature, combinable with any of the previous or following features, wherein the implementation further comprising refining the generated workspace by adjusting the value associated with at least one filter.

A sixth feature, combinable with any of the previous or following features, wherein the implementation further comprising: executing the created ETD pattern; and generating an alert when a log file meeting at least one filter value is detected.

In a third implementation, A computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: identifying, from a normalized log persistency layer, a first Event, wherein the first Event is associated with an attack on a computing system; fetching, from the normalized log persistency layer, a plurality of Events, wherein each fetched Event correlates with its neighboring fetched Event by a at least one correlation attribute; and presenting each of the fetched Event and the first Event on a graphical user interface as a chain of events; generating a workspace, wherein the workspace comprises a series of attack paths, wherein each attack path corresponds to one Event in the chain of events; and creating an enterprise threat detection (ETD) pattern based on the attack paths in the workspace.

The foregoing and other described implementations can each, optionally, include one or more of the following features:

A first feature, combinable with any of the following features, wherein the first Event is associated with a noticed log in an Attack Path View, and wherein the noticed log is noticed during an attack on a computing system.

A second feature, combinable with any of the previous or following features, wherein the chain or events comprises multiple events ordering on a time scale.

A third feature, combinable with any of the previous or following features, wherein the paths associated with the generated workspace correlate with each other, wherein each path of the workspace comprises multiple subsets, and wherein each subset corresponding to a filter with a value.

A fourth feature, combinable with any of the previous or following features, wherein the implementation further comprising refining the generated workspace by adjusting the value associated with at least one filter.

A fifth feature, combinable with any of the previous or following features, wherein the implementation further comprising further comprising: executing the created ETD pattern; and generating an alert when a log file meeting at least one filter value is detected.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware. Data processing hardware encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   identifying, from a normalized log persistency layer, a first Event, wherein the first Event is associated with an attack on a computing system;
   fetching, from the normalized log persistency layer, a plurality of Events, wherein each fetched Event correlates with its neighboring fetched Event by a at least one correlation attribute; and presenting each of the fetched Event and the first Event on a graphical user interface as a chain of events;
   generating a workspace, wherein the workspace comprises a series of attack paths, wherein each attack path corresponds to one Event in the chain of events; and
   creating an enterprise threat detection (ETD) pattern based on the attack paths in the workspace.

2. The computer-implemented method of claim 1, wherein the first Event is associated with a noticed log in an Attack Path View, and wherein the noticed log is noticed during an attack on a computing system.

3. The computer-implemented method of claim 1, wherein the chain or events comprises multiple events ordering on a time scale.

4. The computer-implemented method of claim 1, wherein the paths associated with the workspace correlate with each other.

5. The computer-implemented method of claim 1, wherein each path of the workspace comprises multiple subsets, and wherein each subset corresponds to a filter with a value.

6. The computer-implemented method of claim 5, further comprising refining the workspace by adjusting the value associated with at least one filter.

7. The computer-implemented method of claim 5, further comprising:
   executing the created ETD pattern; and
   generating an alert when a log file meeting the value is detected.

8. A non-transitory, computer-readable medium storing one or more instructions executable by a computer system to perform operations comprising:
   identifying, from a normalized log persistency layer, a first Event, wherein the first Event is associated with an attack on a computing system;
   fetching, from the normalized log persistency layer, a plurality of Events, wherein each fetched Event correlates with its neighboring fetched Event by a at least one correlation attribute; and presenting each of the fetched Event and the first Event on a graphical user interface as a chain of events;
   generating a workspace, wherein the workspace comprises a series of attack paths, wherein each attack path corresponds to one Event in the chain of events; and
   creating an enterprise threat detection (ETD) pattern based on the attack paths in the workspace.

9. The non-transitory, computer-readable medium of claim 8, wherein the first Event is associated with a noticed log in an Attack Path View, and wherein the noticed log is noticed during an attack on a computing system.

10. The non-transitory, computer-readable medium of claim 8, wherein the chain or events comprises multiple events ordering on a time scale.

11. The non-transitory, computer-readable medium of claim 8, wherein the paths associated with the workspace correlate with each other.

12. The non-transitory, computer-readable medium of claim 8, wherein each path of the workspace comprises multiple subsets, and wherein each subset corresponds to a filter with a value.

13. The non-transitory, computer-readable medium of claim 12, further comprising refining the workspace by adjusting the value associated with at least one filter.

14. The non-transitory, computer-readable medium of claim 12, further comprising:
   executing the created ETD pattern; and
   generating an alert when a log file meeting the value is detected.

15. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
   identifying, from a normalized log persistency layer, a first Event, wherein the first Event is associated with an attack on a computing system;
   fetching, from the normalized log persistency layer, a plurality of Events, wherein each fetched Event correlates with its neighboring fetched Event by a at least one correlation attribute; and presenting each of the fetched Event and the first Event on a graphical user interface as a chain of events;
   generating a workspace, wherein the workspace comprises a series of attack paths, wherein each attack path corresponds to one Event in the chain of events; and
   creating an enterprise threat detection (ETD) pattern based on the attack paths in the workspace.

16. The computer-implemented system of claim 15, wherein the first Event is associated with a noticed log in an Attack Path View, and wherein the noticed log is noticed during an attack on a computing system.

17. The computer-implemented system of claim 15, wherein the chain or events comprises multiple events ordering on a time scale.

18. The computer-implemented system of claim 15, wherein the paths associated with the workspace correlate with each other, wherein each path of the workspace comprises multiple subsets, and wherein each subset corresponds to a filter with a value.

19. The computer-implemented system of claim 18, further comprising refining the workspace by adjusting the value associated with at least one filter.

20. The computer-implemented system of claim 18, further comprising:
   executing the created ETD pattern; and
   generating an alert when a log file meeting the value is detected.

* * * * *